United States Patent
Mangal et al.

(10) Patent No.: US 11,625,993 B2
(45) Date of Patent: *Apr. 11, 2023

(54) ASSIGNED SEATING SYSTEM FOR AN AUTOMATED TAXI

(71) Applicant: Motional AD LLC, Boston, MA (US)

(72) Inventors: Nandita Mangal, Los Altos, CA (US); Michael H. Laur, Mission Viejo, CA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/240,960

(22) Filed: Apr. 26, 2021

(65) Prior Publication Data

US 2021/0248882 A1    Aug. 12, 2021

Related U.S. Application Data

(63) Continuation of application No. 16/829,013, filed on Mar. 25, 2020, now Pat. No. 10,991,212, which is a
(Continued)

(51) Int. Cl.
*G08B 5/22* (2006.01)
*G06F 3/147* (2006.01)
*G05D 1/02* (2020.01)

(52) U.S. Cl.
CPC ............. *G08B 5/221* (2013.01); *G06F 3/147* (2013.01); *G05D 1/021* (2013.01); *G05D 2201/0212* (2013.01)

(58) Field of Classification Search
CPC ........ G08B 5/221; G06F 3/147; G05D 1/021; G05D 2201/0212; G06Q 10/06;
(Continued)

(56) References Cited

U.S. PATENT DOCUMENTS

| 10,152,053 B1 | 12/2018 | Smith |
| 10,289,288 B2 | 5/2019 | Penilla et al. |

(Continued)

FOREIGN PATENT DOCUMENTS

| CN | 105015553 | 11/2015 |
| CN | 105096232 | 11/2015 |

(Continued)

OTHER PUBLICATIONS

EP Search Report and Written Opinion in European Appln. No. 19183553.7, dated Aug. 14, 2019, 7 pages.

(Continued)

*Primary Examiner* — Eric Blount
(74) *Attorney, Agent, or Firm* — Fish & Richardson P.C.

(57) ABSTRACT

A system for an automated-taxi includes a display and a controller. The display is viewable by one or more of a plurality of clients of an automated-taxi. The controller-circuit is in communication with the display. The controller is configured to determine a seating-arrangement of the plurality of clients transported by the automated-taxi. The seating-arrangement is determined in accordance with destinations of the plurality of clients. The controller is also configured to operate the display to show the seating-arrangement to one or more of the plurality of clients. A method of operating an automated-taxi includes receiving destinations of a plurality of clients to transported by an automated-taxi; determining a seating-arrangement of the plurality of clients in accordance with the destinations; and operating a display viewable by one or more of a plurality of clients of an automated-taxi to show the seating-arrangement to one or more of the plurality of clients.

20 Claims, 2 Drawing Sheets

Related U.S. Application Data continuation of application No. 16/033,467, filed on Jul. 12, 2018, now Pat. No. 10,643,439.

(60) Provisional application No. 62/696,428, filed on Jul. 11, 2018.

(58) Field of Classification Search
CPC .. G06Q 10/06311; G06Q 50/30; G06Q 10/02; G06Q 10/0631; G08G 1/202
USPC ............................................................ 340/434
See application file for complete search history.

(56) References Cited

U.S. PATENT DOCUMENTS

| | | | |
|---|---|---|---|
| 10,643,439 | B2 | 5/2020 | Mangal et al. |
| 10,991,212 | B2 * | 4/2021 | Mangal et al. ........ G06Q 10/02 |
| 2013/0238167 | A1 | 9/2013 | Stanfield et al. |
| 2014/0058896 | A1 | 2/2014 | Jung |
| 2015/0096813 | A1 | 4/2015 | Aumente |
| 2015/0339928 | A1 | 11/2015 | Ramalingam et al. |
| 2017/0075358 | A1 | 3/2017 | Zhang |
| 2018/0039917 | A1 | 2/2018 | Bultolo et al. |
| 2018/0059913 | A1 | 3/2018 | Penilla et al. |
| 2018/0275648 | A1 | 9/2018 | Ramalingam et al. |
| 2018/0373936 | A1 * | 12/2018 | Kim .................... G06V 40/103 |
| 2019/0050758 | A1 | 2/2019 | Kyllman |
| 2020/0020209 | A1 | 1/2020 | Mangal et al. |
| 2020/0226889 | A1 | 7/2020 | Mangal et al. |

FOREIGN PATENT DOCUMENTS

| | | |
|---|---|---|
| CN | 107124551 | 9/2017 |
| CN | 108116277 | 6/2018 |
| MX | 2015017426 | 8/2016 |

OTHER PUBLICATIONS

Office Action in Chinese Appln. No. 201910619768.X, dated Feb. 15, 2023, 17 pages (with English translation).

* cited by examiner

ASSIGNED SEATING SYSTEM FOR AN AUTOMATED TAXI

CROSS-REFERENCE TO RELATED APPLICATIONS

This application is a continuation of U.S. patent application Ser. No. 16/829,013, filed Mar. 25, 2020, which is a continuation application and claims the benefit under 35 U.S.C. § 120 of U.S. patent application Ser. No. 16/033,467, filed Jul. 12, 2018, now U.S. Pat. No. 10,643,439, issued May 5, 2020, which claims priority to U.S. Provisional Patent Application No. 62/696,428, filed Jul. 11, 2018, the entire disclosures of each of which are hereby incorporated herein by reference.

TECHNICAL FIELD OF INVENTION

This disclosure generally relates to a system for an automated-taxi, and more particularly relates to a system that determines a seating-arrangement of the plurality of clients in accordance with destinations of the plurality of clients, and operates the display to show the seating-arrangement to one or more of the plurality of clients.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
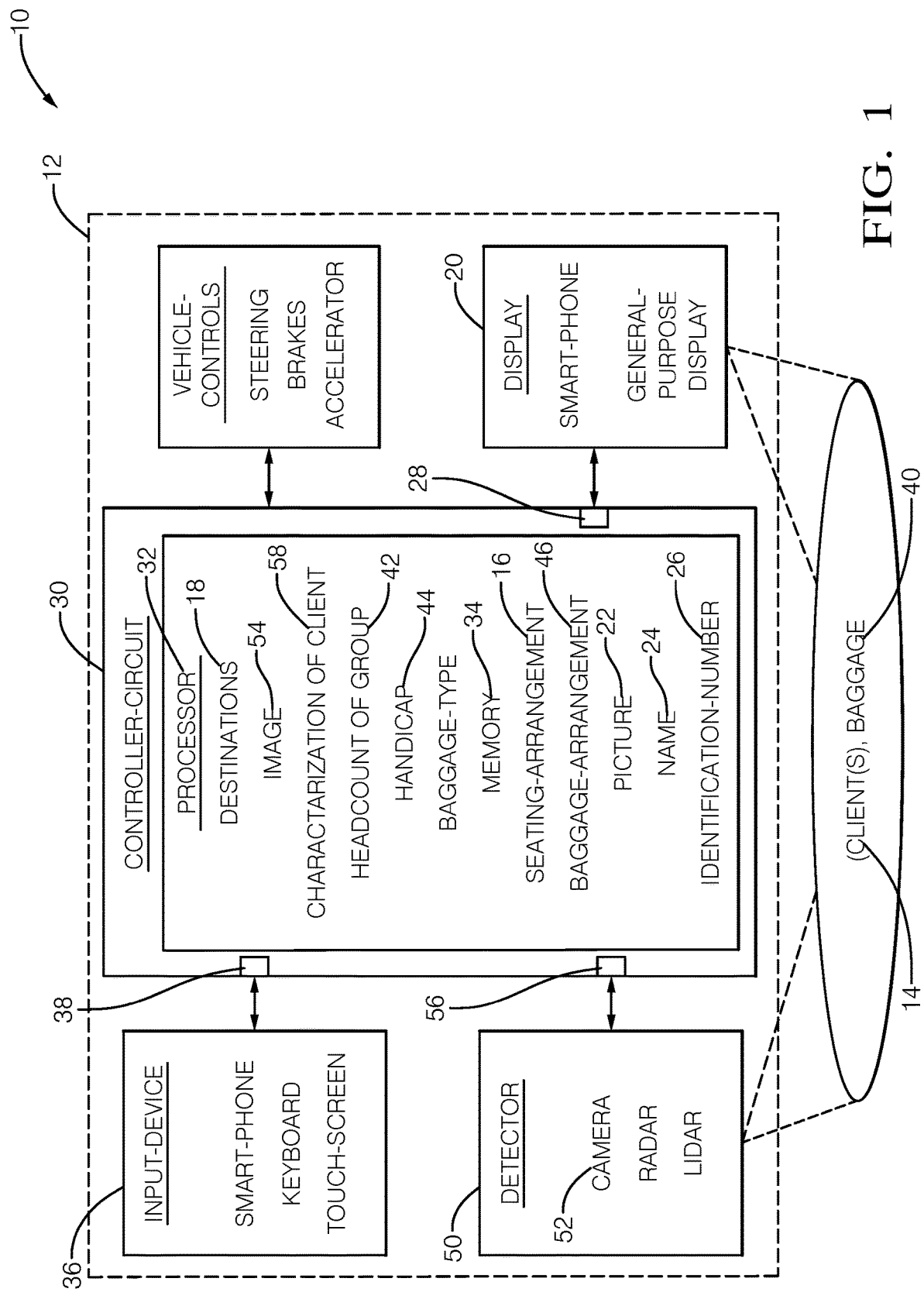
FIG. 1 is a diagram of a system for operating an automated-taxi in accordance with one embodiment.

FIG. 1 illustrates a non-limiting example of a system 10 for an automated-taxi 12. As will be described in more detail below, an aspect of the system 10 is to determine and indicate to a plurality of clients 14 an optimum or preferred instance of a seating-arrangement 16 of the clients 14 that are to be transported in or by the automated-taxi 12, which is sometimes referred to as an automated-mobility-on-demand (AMOD) type of vehicle. The automated-taxi 12 may be characterized as an automated vehicle. As used herein, the term automated vehicle may apply to instances when the automated-taxi 12 is being operated in an automated-mode, i.e. a fully autonomous mode, where there may not be a human-operator of the automated-taxi 12, and the clients 14 do little more than designate one or more destinations 18 to be transported to by the automated-taxi 12. However, full automation is not a requirement. It is contemplated that the teachings presented herein are useful when the automated-taxi 12 is operated in a manual-mode where there is a human-operator driving the automated-taxi 12, and the degree or level of automation may be as little as only determining and indicating the seating-arrangement 16 to the clients 14.

The system 10 includes a display 20 that is viewable by one or more of the plurality of clients 14 of the automated-taxi 12 so the seating-arrangement 16 can be conveyed or displayed to the clients 14. By way of example and not limitation, the display 20 may include or consist of a smart-phone carried by one or more or each of the clients 14, and/or one or more general-purpose displays that may be mounted inside and/or outside the automated-taxi 12 where the display 20 is viewable by the clients 14. If the clients 14 are all being picked up at the same location, e.g. at a transportation-kiosk, an instance of the display 20 may be located at the pick-up site so the clients 14 can be pre-organized (i.e. lined up) to facilitate an orderly loading of the automated-taxi 12. Another option contemplated is to place individual displays proximate to each seat, cargo area, handicapped area, and/or allocable (i.e. reconfigurable) area in the automated-taxi 12 to indicate who of the clients 14 is assigned to each of the seats or various areas in the automated-taxi 12. Information displayed on any examples of the display 20 may include, but is/are not limited to, one or more of a picture 22, a name 24, and/or an identification-number 26 associated with each of the plurality of clients 14 to indicate or convey the seating-arrangement 16 to the clients 14.

The system 10 includes a controller-circuit 30 in communication with the display 20 via an output 28. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining and displaying the seating-arrangement 16 based on the destinations 18 received by the controller 30 as described elsewhere herein.

The controller 30 (or the processor 32) is configured to determine the seating-arrangement 16 of the plurality of clients 14 transported by the automated-taxi 12. In one embodiment of the system 10, the seating-arrangement 16 is determined in accordance with the destinations 18 of the plurality of clients 14. By way of example and not limitation, the seating-arrangement 16 may be a first-in/last-out type of arrangement if there is only one door by which the clients 14 enter and exit the automated-taxi 12. That is, the client 14 assigned a seat furthest from the door may be traveling to the last destination of a planned route, and the client seated next to the door may be traveling to the first-destination. By way of another example, if the automated-taxi 12 has entry/exit doors on both sides, then the seating-arrangement 16 may also take into consideration the destinations 18 where unloading from either side (rather than only curb-side) of the automated-taxi 12 can be safely accomplished.

The controller 30 (or the processor 32) may also be configured to operate the display 20 to show the seating-arrangement 16 to one or more of the plurality of clients 14 and operate the automated-taxi 12 to transport the plurality of clients 14 to the destinations 18. If one or more of the clients 14 do not sit in their assigned seats, the system 10, i.e. the controller 30 or the processor 32, may prevent the automated-taxi 12 from moving until all the clients 14 are seated in their assigned seats. Alternatively, the system 10 may inform the clients 14 that they are not in their assigned seats, and request permission to proceed regardless. At the destinations 18 for the clients 14, the system 10 may determine if the clients 14 with a seating-arrangement 16 has exited. The system 10 may interact with the clients 14 to determine if their destination has changed and ensure that the clients 14 are aware that the destination has been reached.

The system 10 may include an input-device 36 that may be connected to controller 30 via a receiver 38, i.e. a wireless receiver. While FIG. 1 may be interpreted to suggest that the input-device 36 is part of the automated-taxi 12, it is contemplated that the input-device 36 may also be located remote from the automated-taxi 12. That is, there may be multiple instances of the input-device 36 located in, on, and/or remote from the automated-taxi 12. By way of example and not limitation, the input-device 36 may include or consist of a smart-phone carried by one of the clients 14, which could be the same smart-phone used as the display 20. Alternatively, or in addition, the input-device 36 may be a keyboard or touch-screen (could also be an instance of the display 20) mounted inside and/or outside the automated-taxi 12, and/or at a pick-up kiosk. The input-device 36 may be used by the clients 14 to indicate the destinations 18 of the clients 14. Accordingly, the input-device 36 is configured so one or more of the clients 14 can enter or indicate the destinations of one or more of the clients 14. That is, each client may individually enter their own destination and other relevant identification information. The input-device 36 may optionally serve as a means of payment for the transportation to be provided by the automated-taxi 12.

The input-device 36 may also be configured so a client 14 can indicate one or more of: baggage 40 associated with the client, a headcount 42 of a group associated with the client, and a handicap 44 of a client. As will be described in more detail below, this information may also be used to determine the seating-arrangement 16 which may include, but is not limited to, assigning a seat to all or part of the baggage 40 carried by one or more of the clients if the automated-taxi 12 does not have a trunk or separate area for the baggage 40, and/or the trunk is not large enough to accommodate all the baggage 40 of all the clients 14. The headcount 42 is used to determine how many seats of the automated-taxi 12 are needed to transport all the group associated with a client. The handicap 44 may be used to determine if one or more seats designated as handicap-accessible should be reserved for that client. For example, if the client is in a wheel-chair, it may be necessary to reserve two adjacent seats that are reconfigurable (e.g. fold up) so the automated-taxi 12 can accommodate the wheel-chair. By way of further non-limiting examples, the handicap 44 may indicate: a need for a window seat due to motion-sickness susceptibility, a need for extra space for service-animal, and/or a mobility limitation due to age.

To this end, the controller-circuit 30 (or the processor 32) may be configured to determine a baggage-arrangement 46 of baggage of one or more of the plurality of clients 14 transported by the automated-taxi 12 in addition to the seating-arrangement. The baggage-arrangement 46 may be determined in accordance with destinations 18 of the plurality of clients 14. For example, if the trunk is configured so that not all the baggage is directly accessible, i.e. some of the baggage 40 is buried behind other baggage, the baggage-arrangement 46 may indicate a placement of the baggage 40 associated with a first destination to be directly accessible, and the baggage 40 associated with a last destination be initially all or partially buried. It follows that the controller-circuit 30 may operate the display 20 to show the baggage-arrangement 46 to one or more of the plurality of clients 14 so the baggage 40 can be loaded into the automated-taxi 12 in an organized manner.

As an alternative to the clients 14 having to manually enter or indicate all the various information suggested above using the input-device 36, the system 10 may include a detector 50 such as, but not limited to, a camera 52 and/or other devices such as radar, lidar, a weight-scale, etc., that can be used to determine, for example, a volume/count of luggage/bags carried by the clients 14, the headcount 42 of the group associated with an instance of the clients 14, and/or a handicap 44 of the client. Accordingly, in one embodiment, the system 10 includes a detector 50 such as the camera 52 which may be mounted/located inside and/or outside the automated-taxi 12, and/or at a pick-up kiosk. The camera 52 may be used to render an image 54 of one or more of the clients 14. The controller-circuit 30 may be in communication with the detector 50 (e.g. the camera 52) via an input 56, and the controller-circuit 30 may be configured to determine the characterization 58 of one or more of the client 14 in accordance with the image 54. The controller 30 may determine the characterization based on the image 54 using known image matching techniques.

By way of example and not limitation, the characterization 58 may include one or more of: information about the baggage 40 (baggage-volume, a baggage-weight, a bag-count, and/or a baggage-type, e.g. luggage or groceries) associated with one or more of the clients 14; a headcount 42 of a group associated with the client; and/or a handicap 44 of the client. The handicap 44 may be indicated by the image 54 showing the presence of a wheelchair/walker, a white-cane often associated with blindness, the presence of a service-animal, or other mobility limitations. The detector may also include an alcohol-detector used to detect intoxication of a client.

Figure 2:
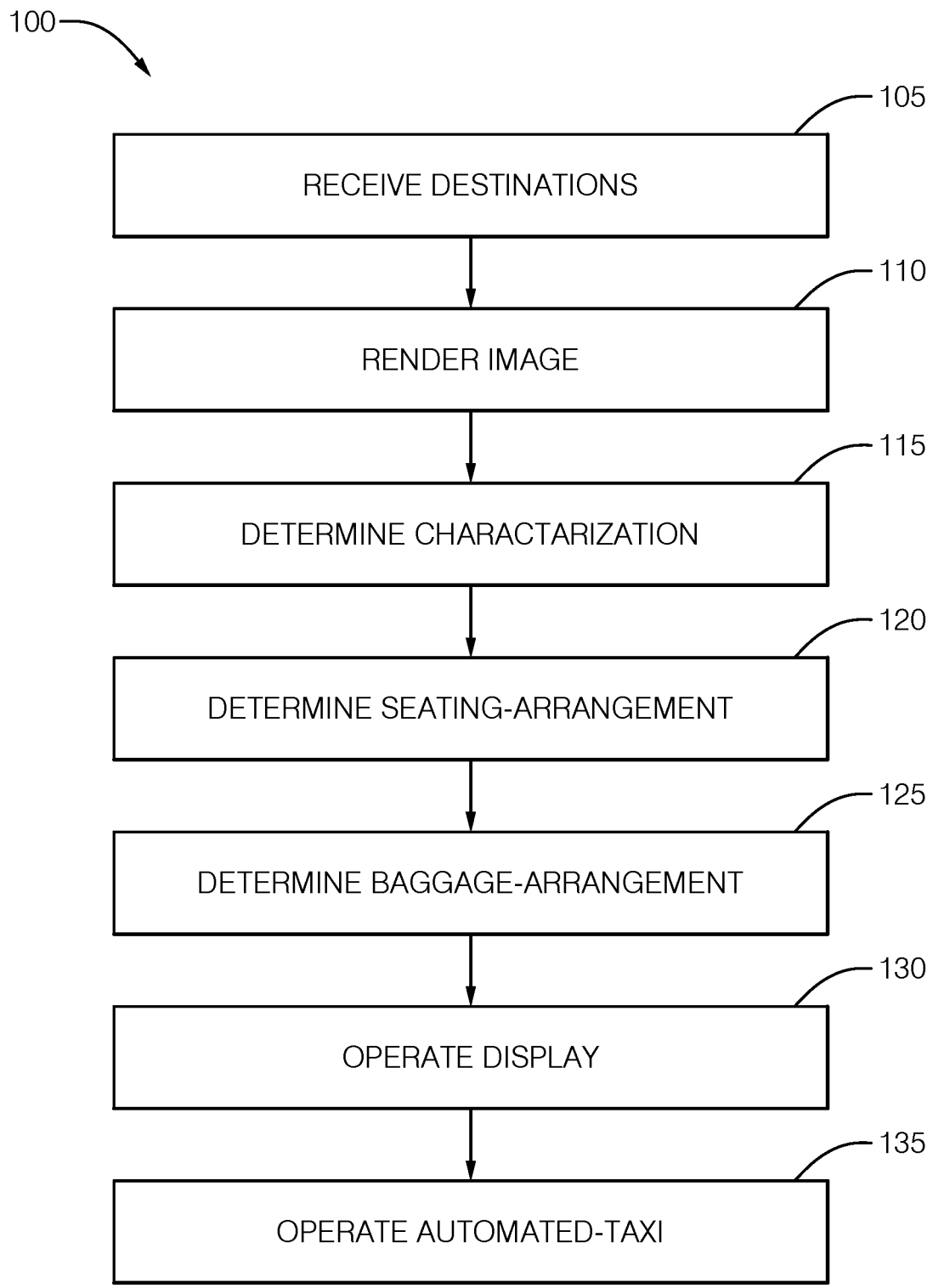
FIG. 2 is a method of operating the system of FIG. 1 in accordance with one embodiment.

FIG. 2 illustrates a non-limiting example of a method 100 of operating an automated-taxi 12.

Step 105, RECEIVE DESTINATIONS, may include receiving the destinations 18 of the plurality of clients 14 to transported by an automated-taxi 12 by way of the input-device 36. The destinations 18 may be communicated using the web/internet if smart-phones are being used, or by wired or wireless communication if the input device is in/on the automated-taxi 12 and/or at a transportation kiosk.

Step 110, RENDER IMAGE, may include rendering (i.e. taking or capturing) an image of a client with the camera 52. The camera 52 may be mounted on the automated-taxi 12 and/or located remote from the automated-taxi 12 such as at a transportation kiosk. Alternatively, the camera 52 may be part of a smart-phone operated by the client 14, and the image 54 may have been rendered as part of a prior reservation and stored in the smart-phone or in the memory 34 of the system 10 for repeated use.

Step 115, DETERMINE CHARACTERIZATION, may include receiving from a client 14 (via the input-device 36) one or more of: a listing or accounting of the baggage 40 associated with the client, a headcount 42 of a group associated with the client, and/or a handicap 44 of the client. It is also contemplated that some of this information may be retrieved from a customer-profile stored by the system 10 for repeat customers/clients. From this information, the characterization 58 can be determine which may include indicating a preferred seat and/or a determination of how much space in the automated-taxi 12 will be occupied by the client 14 and any associated other objects such as baggage and/or a service animal. If an image 54 is available, then determining the characterization 58 of the client 14 in accordance with the image 54 may include performing an image-analysis of the image using any of a number of known techniques. As above, the characterization 58 may include one or more of baggage 40 associated with the client 14, a headcount 42 of a group associated with the client, and/or a handicap 44 of a client 14.

Step 120, DETERMINE SEATING-ARRANGEMENT, may include determining the seating-arrangement 16 of the plurality of clients in accordance with the destinations 18 and/or the image 54. If all the clients 14 and all associated baggage will fit in the automated-taxi 12, then a route to all the destinations 18 can be planned for the automated-taxi 12 to follow. From the route, the order in which the destinations 18 will be reached is known, so an appropriate instance of the seating-arrangement 16 can be determined. It is contemplated that the route may not always be the most efficient route as preference may be given to frequent clients, or given to those clients who are willing to pay a premium for faster travel. While some might interpret the description so far as being limited to situations where all the clients 14 board the automated-taxi at the same location, this is not the case. It is contemplated that the route may include picking up other clients after the route is started, before or after some or all the initial clients have reached their respective destinations.

Step 125, DETERMINE BAGGAGE-ARRANGEMENT, may include determining a baggage-arrangement of the baggage 40 of one or more of the plurality of clients 14 to be transported by the automated-taxi 12 based on the route that was determine based on the destinations and other factors mentioned above. It is contemplated that situations may arise where it is not possible or appropriate or necessary to require that all the baggage 40 be placed in a trunk of the automated-taxi 12. That is, situations are contemplated where some or all baggage of a client 14 may be placed on one or more seats inside the automated-taxi 12 or on the floor of the automated-taxi 12.

Step 130, OPERATE DISPLAY, may include operating a display 20 viewable by one or more of a plurality of clients 14 of an automated-taxi 12 to show the seating-arrangement 16 and/or the baggage-arrangement to one or more of the plurality of clients. Displaying the seating-arrangement 16 may include operating the display to show one or more of a picture, a name, and an identification-number associated with each of the plurality of clients 14 to indicate the seating-arrangement 16

Step 135, OPERATE AUTOMATED-TAXI, may include the controller 30 or the processor 32 operating the vehicle-controls (e.g. steering, accelerator, and/or brakes) of the automated-taxi 12 to transport the plurality of clients 14 to the destinations if the automated-taxi is operated in an autonomous mode.

Describe herein is a first device 30 that includes one or more processors 32; memory 34; and one or more programs 105-135 stored in memory 34. The one or more programs 105-135 including instructions for performing all or part of the method 100. Also, described herein is a non-transitory computer-readable storage-medium 34 that includes one or more programs 105-135 for execution by one or more processors 32 of a first device 30, the one or more programs 105-135 including instructions which, when executed by the one or more processors 32, cause the first device to perform all or part of the method 100.

Accordingly, a system 10, a controller 30 for the system 10, and a method 100 of operating the system 10 are provided. A seating-arrangement 16 is determined so that as the automated-taxi 12 travels to a series of the destinations 18, the clients 14 (i.e. the passengers) of the automated-taxi 12 can unload efficiently, e.g. without some of the clients 14 having to temporarily unload from the automated-taxi 12 so that those of the clients 14 who are at their destination can unload or disembark. That is, the clients 14 (and optionally the baggage 40) are loaded so that when a destination is reached, the clients 14 who need to unload can do so easily.

While this invention has been described in terms of the preferred embodiments thereof, it is not intended to be so limited, but rather only to the extent set forth in the claims that follow.

We claim:

1. A system comprising:
    at least one programmable processor; and
    a machine-readable medium storing instructions that, when executed by the at least one programmable processor, causes the at least one programmable processor to perform operations comprising:
        obtaining an image of a passenger;
        determining, based on the image, a characterization of the passenger;
        determining, based on the characterization of the passenger and a destination of the passenger, a seating location within the vehicle for the passenger; and
        presenting the seating location to the passenger.

2. The system in accordance with claim 1, wherein the characterization of the passenger comprises one or more of a special need of the passenger, at least one baggage of the passenger, and a number of other passengers riding together in a group including the passenger.

3. The system in accordance with claim 2, wherein the special need of the passenger is based on one or more of an age of the passenger, a mobility limitation of the passenger, a service-animal accompanying the passenger, or a sickness of the passenger.

4. The system in accordance with claim 3, wherein the operations further comprise:
    receiving, as input prior to the determining of the seating location, one or more of the age of the passenger, the mobility limitation of the passenger, an indication of the service-animal accompanying the passenger, or the sickness of the passenger.

5. The system in accordance with claim 1, wherein the operations further comprise:
    determining, based on the destination of the passenger, a baggage location of a baggage of the passenger; and
    presenting the baggage location in the vehicle to the passenger.

6. The system in accordance with claim 1, wherein the operations further comprise:
    receiving, as input prior to the determining of the seating location, the destination of the passenger.

7. The system in accordance with claim 1, wherein the operations further comprise:
    presenting an identification of the passenger along with the seating location of the passenger in the vehicle to the passenger.

8. The system in accordance with claim 7, wherein the identification comprises one or more of a picture of the passenger, a name of the passenger, or an identification-number of the passenger.

9. A method comprising:
    obtaining an image of a passenger;
    determining, based on the image, a characterization of the passenger;
    determining, based on the characterization of the passenger and a destination of the passenger, a seating location within the vehicle for the passenger; and
    presenting the seating location in the vehicle to the passenger.

10. The method in accordance with claim 9, wherein the characterization of the passenger comprises one or more of a special need of the passenger, at least one baggage of the passenger, and a number of other passengers riding together in a group including the passenger.

11. The method in accordance with claim 10, wherein the special need of the passenger is based on one or more of an age of the passenger, a mobility limitation of the passenger, a service-animal accompanying the passenger, or a sickness of the passenger,
    wherein the method further comprises:
        receiving, as input prior to the determining of the seating location, one or more of the age of the passenger, the mobility limitation of the passenger, an indication of the service-animal accompanying the passenger, or the sickness of the passenger.

12. The method in accordance with claim 9, further comprising:
    determining, based on the destination of the passenger, a baggage location of a baggage of the passenger; and
    presenting the baggage location in the vehicle to the passenger.

13. The method in accordance with claim 9, further comprising:
    receiving, as input prior to the determining of the seating location, the destination of the passenger.

14. The system in accordance with claim 9, further comprising presenting an identification of the passenger along with the seating location of the passenger in the vehicle, wherein the identification comprises one or more of a picture of the passenger, a name of the passenger, or an identification-number of the passenger.

15. One or more non-transitory computer program products storing instructions that, when executed by at least one programmable processor, cause the at least one programmable processor to perform operations comprising:
    obtaining an image of a passenger;
    determining, based on the image, a characterization of the passenger;
    determining, based on the characterization of the passenger and a destination of the passenger, a seating location within the vehicle for the passenger; and
    presenting the seating location in the vehicle to the passenger.

16. The system in accordance with claim 15, wherein the characterization of the passenger comprises one or more of a special need of the passenger, at least one baggage of the passenger, and a number of other passengers riding together in a group including the passenger.

17. The one or more non-transitory computer program products in accordance with claim 16, wherein the special need of the passenger is based on one or more of an age of the passenger, a mobility limitation of the passenger, a service-animal accompanying the passenger, or a sickness of the passenger,
    wherein the method further comprises:
        receiving, as input prior to the determining of the seating location, one or more of the age of the passenger, the mobility limitation of the passenger, an indication of the service-animal accompanying the passenger, or the sickness of the passenger.

18. The one or more non-transitory computer program products in accordance with claim 15, wherein the operations further comprise:
    determining, based on the destination of the passenger, a baggage location of a baggage of the passenger; and
    presenting the baggage location in the vehicle to the passenger.

19. The one or more non-transitory computer program products in accordance with claim 15, wherein the operations further comprise:
  receiving, as input prior to the determining of the seating location, the destination of the passenger.

20. The one or more non-transitory computer program products in accordance with claim 15, wherein the operations further comprise presenting an identification of the passenger along with the seating location of the passenger in the vehicle, wherein the identification comprises one or more of a picture of the passenger, a name of the passenger, or an identification-number of the passenger.

* * * * *

UNITED STATES PATENT AND TRADEMARK OFFICE
CERTIFICATE OF CORRECTION

| | | |
|---|---|---|
| PATENT NO. | : 11,625,993 B2 | Page 1 of 1 |
| APPLICATION NO. | : 17/240960 | |
| DATED | : April 11, 2023 | |
| INVENTOR(S) | : Nandita Mangal and Michael H. Laur | |

It is certified that error appears in the above-identified patent and that said Letters Patent is hereby corrected as shown below:

In the Claims

Column 8, Line 25, (Claim 14), delete "system" insert -- method --

Column 8, Line 44, (Claim 16), delete "system" insert -- one or more non-transitory computer program products --

Signed and Sealed this
Sixth Day of June, 2023

Katherine Kelly Vidal
*Director of the United States Patent and Trademark Office*